United States Patent [19]

Lang et al.

[11] 4,438,180

[45] Mar. 20, 1984

[54] PROCESS FOR COATING NYLON FILM WITH VINYLIDENE CHLORIDE COPOLYMERS

[75] Inventors: Theodore J. Lang; Bernard J. Kershaw, both of Kingston, Canada

[73] Assignee: Du Pont Canada Inc., Mississauga, Canada

[21] Appl. No.: 408,492

[22] Filed: Aug. 16, 1982

[30] Foreign Application Priority Data

Aug. 27, 1981 [CA] Canada ................................ 384698
Dec. 1, 1981 [CA] Canada ................................ 391235

[51] Int. Cl.³ .............................................. B23B 27/08
[52] U.S. Cl. .................................. 428/475.8; 427/379; 427/385.5; 427/393.5; 427/407.1; 427/412.1; 428/476.1; 428/518
[58] Field of Search ............... 428/475.8, 476.1, 475.5; 427/202, 407.1, 412.1, 393.5, 379, 385.5

[56] References Cited

U.S. PATENT DOCUMENTS 3,514,367 5/1970 James .................................. 428/216
3,805,848 4/1974 Chrow .............................. 428/475.8

FOREIGN PATENT DOCUMENTS 959455 6/1964 United Kingdom ............ 427/407.1

*Primary Examiner*—Thomas J. Herbert, Jr.

[57] ABSTRACT

A process for coating nylon film with polyvinylidene chloride is disclosed, comprising primer-coating the nylon film with an aqueous dispersion of a vinylidene chloride copolymer having a crystallinity index of less than 1.15 after 30 days' storage at 20° C. and between about 1.05 and 1.20 when stored for 48 hours at 40° C.; drying the primer-coated film; coating the primer-coated film with an aqueous dispersion of a vinylidene chloride copolymer capable of developing crystallinity to a level sufficient that the crystalline vinylidene chloride copolymer so-formed resists attack by an organic solvent, as measured by the Solvent Haze Test; and drying the coated film. During primer-coating and the first drying step, the film is kept under sufficient tension to prevent curling of the film. The coated film may be laminated to polyethylene to provide a laminate useful for packaging of processed food.

10 Claims, No Drawings

PROCESS FOR COATING NYLON FILM WITH VINYLIDENE CHLORIDE COPOLYMERS

BACKGROUND

1. Field of the Invention

The present invention relates to the coating of nylon films with vinylidene chloride copolymers.

2. Description of the Prior Art

It is known to use aqueous dispersions of vinylidene chloride copolymers containing 80 to 95%, by weight, of vinylidene chloride for coating purposes according to the disclosure in U.K. Pat. No. 959,455 to Farbwerke Hoechst AG, published June 3, 1964. This patent discloses that dispersions of copolymers having vinylidene chloride contents greater than about 92%, by weight, are preponderantly amorphous. However, such copolymers soon change after drying, in most cases within a few days, into a crystalline state and are, therefore, often referred to as "crystalline vinylidene chloride copolymers." The crystallinity index of crystalline vinylidene chloride copolymers, as measured by infrared spectroscopy, is generally above 1.15. It is also reported that dispersion of copolymers having less than 92%, by weight, of vinylidene chloride are also amorphous and that this amorphous structure may last for weeks or months after drying of the copolymer. The latter copolymers are often referred to as "amorphous vinylidene chloride copolymers." The crystallinity index of amorphous vinylidene copolymers, as measured by infrared spectroscopy, is generally 1.15 or less.

Coatings of the vinylidene chloride copolymers which remain in the amorphous form tend to exhibit a blocking effect. As used herein the term "blocking" refers to the well-known property of some films wherein difficulty is experienced when attempting to peel a layer of the film from a layer of a similar or different film. Although the blocking effect of amorphous vinylidene chloride copolymers may be overcome to a large extent by the addition of slip additives, such copolymers are not as impermeable to gases, e.g., oxygen, as are the crystalline copolymers.

In addition to the above, the amorphous copolymers tend to absorb volatile organic solvents. Such a propensity to absorb organic solvents is disadvantageous when the vinylidene chloride copolymer coating is laminated to other webs, e.g., polyolefin films. Organic solvents which are present in the adhesive, e.g., polyurethane adhesive, used to laminate the vinylidene chloride copolymer to the web, tend to become trapped in the vinylidene chloride copolymer coating. Such entrapment may lead to migration of the solvent into packages, e.g., packages of processed meats, made from the laminate, and to poor bonding of the vinylidene chloride copolymer to the webs to which it is laminated. Because of the disadvantages associated with vinylidene chloride copolymers which remain substantially amorphous, vinylidene chloride copolymers which become crystalline tend to be favored for coatings because of their resistance to absorption of organic solvents. However, crystalline vinylidene chloride copolymers do not readily adhere to nylon film.

In the manufacture of nylon film coated with crystalline vinylidene chloride copolymers, it is desirable to improve the adhesion of the copolymer to the nylon film through the use of an intermediary primer composition. One such primer is a polyurethane, as disclosed by D. G. James in U.S. Pat. No. 3,514,367, issued May 26, 1970. Other primers are disclosed in the aforementioned U.K. Pat. No. 959,455. A disadvantage of certain of these primers is that volatile organic solvents are required for application of the primer to the nylon film. In the workplace, aqueous systems would be preferred, as the hazard of flammability of organic solvents is not present. Notwithstanding any desire to use aqueous systems for coating nylon films, the tendency of nylon films to absorb moisture when in the presence of water and the resulting tendency of the nylon film to curl has inhibited the use of such systems.

Aqueous dispersions of vinylidene chloride copolymers which remain in the amorphous form, even at temperatures between ambient and the melting temperature of the vinylidene chloride copolymer, have been tested as a primer for nylon film, and the primer-coated film has then been further coated with a crystalline vinylidene chloride copolymer. However, such amorphous vinylidene chloride copolymer coatings, when brought into contact with moisture, turned hazy and gave a turbid appearance to the film. Such an appearance may be objectionable to consumers who wish to obtain a clear view of materials, e.g., food packaged in the vinylidene chloride copolymer coated nylon film.

It has now been found that amorphous vinylidene chloride copolymers which crystallize slowly under ambient temperatures and which crystallize relatively easily at elevated temperatures, e.g., 40° C., may also be used as primers.

SUMMARY OF THE INVENTION

Accordingly the present invention provides a process for coating nylon film with a vinylidene chloride copolymer, comprising:

(a) coating the nylon film with an aqueous dispersion of vinylidene chloride copolymer while keeping the nylon film under sufficient machine and transverse direction tensions to prevent curling of the nylon film, to form a primer-coated film, said vinylidene chloride copolymer having a crystallinity index of less than 1.15, when dry, after 30 days' storage at 20° C., and a crystallinity index, when dry, of between about 1.05 and 1.20 when stored for 48 hours at 40° C.;

(b) drying the primer-coated film to remove substantially all of the water from the dispersion, while maintaining the primer-coated film under said machine and transverse direction tensions and at a drying rate sufficiently high to prevent curling of the primer-coated film;

(c) coating the primer-coated film with an aqueous dispersion of a vinylidene chloride copolymer which, when dry, is capable of developing crystallinity to a level sufficient that the crystalline vinylidene chloride copolymer so-formed resists attack by an organic solvent, as measured by the Solvent Haze Test, said organic solvent being capable of dissolving vinylidene chloride copolymers having a crystallinity index of less than 1.05, to form a vinylidene chloride copolymer coated film; and (d) drying the vinylidene chloride copolymer coated film and allowing the vinylidene chloride copolymer applied in step (c) to develop sufficient crystallinity to resist attack by the organic solvent, as measured by the Solvent Haze Test.

The term "dispersion" as used herein encompasses emulsions.

The coating applied during step (a) of the process is sometimes referred to as a "primer coating." The coating applied in step (c) of the process is sometimes referred to as a "top coating."

In a preferred embodiment, the vinylidene chloride copolymer applied in step (a) has a crystallinity index, when dry, of between 1.0 and 1.05 when stored for 30 days at 20° C., and a crystallinity index, when dry, between about 1.05 and 1.20 when stored for 48 hours at 40° C.

In another embodiment the vinylidene chloride copolymer dispersion used in step (a) has an amount of a low boiling alcohol, e.g., isopropyl alcohol, sufficient to prevent foaming of the dispersion upon coating the film and to aid in the quick drying of step (b).

In another embodiment the vinylidene chloride copolymer applied in step (c) is capable of crystallizing to a crystallinity index, when dry, of 1.20 or higher after storage of up to 24 days at 20° C.

In a further embodiment the vinylidene chloride copolymer dispersion applied during step (c) is applied using a low shear method of application. Preferred low shear methods include smooth roll, Meyer TM rod, and reverse gravure methods. High shear methods, e.g., direct gravure roll and offset gravure methods may be used if the vinylidene chloride copolymer dispersion is appropriately formulated to control foaming.

In yet another embodiment, the water content of the vinylidene chloride copolymer dispersions applied in steps (a) and (c) are preferably between 40 and 55%, by weight, of the dispersion.

In still another embodiment moisture is directed at the nylon film, during step (a), on the side opposite to the side being coated with the vinylidene chloride copolymer dispersion.

The present invention also provides a nylon film, coated with a vinylidene chloride copolymer, said film having been prepared by a process comprising:

(a) coating the nylon film with an aqueous dispersion of a vinylidene chloride copolymer while keeping the nylon film under sufficient machine and transverse direction tensions to prevent curling, to form a primer-coated film, said vinylidene chloride copolymer having a crystallinity index of less than 1.15, when dry, after 30 days' storage at 20° C., and a crystallinity index, when dry, between about 1.05 and 1.20 when stored for 48 hours at 40° C.;

(b) drying the primer-coated film to remove substantially all of the water from the dispersion, while maintaining the primer-coated film under said machine and transverse direction tensions and at a drying rate sufficiently high to prevent curling of the primer-coated film;

(c) coating the primer-coated film with an aqueous dispersion of a vinylidene chloride copolymer which, when dry, is capable of developing crystallinity to a level sufficient that the crystalline vinylidene chloride copolymer so-formed resists attack by an organic solvent, as measured by the Solvent Haze Test, said organic solvent being capable of dissolving vinylidene chloride copolymers having a crystallinity index of less than 1.05, to form a vinylidene chloride copolymer coated film; and (d) drying the vinylidene chloride copolymer coated film and allowing the vinylidene chloride copolymer applied in step (c) to develop sufficient crystallinity to resist attack by the organic solvent, as measured by the Solvent Haze Test.

DETAILED DESCRIPTION

In the process of the present invention, most primer coatings may be applied by means of a gravure roll. The primer-coated film is then passed through a drying oven. While passing through the drying oven the primer-coated film is kept under tension in both the machine and transverse directions. Such tension may be provided by known means, e.g., in a so-called roll support oven or in a floater oven. Top coatings of crystalline vinylidene chloride copolymer dispersion which have a propensity to foam are conveniently applied over the primer coating by means of a reverse gravure roll. Other top coatings may be applied by gravure roll. The coated film so-formed may then be passed through a drying oven, which removes the water from the vinylidene chloride copolymer dispersion and tends to assist in the development of the crystallinity of the vinylidene chloride copolymer top coat layer. Additionally, crystallinity of the top coat may develop in the following few days. As indicated hereinbefore development of the crystallinity of the top coat is believed to be important in order to improve the oxygen barrier properties of the top coat and to resist solvent attack and/or retention in solvent lamination processes.

Preferably, steps (a) to (d) are carried out as a continuous process. However, if more convenient, the primer-coated film resulting from step (b) may be wound onto a core and stored until required for top coating. It is thought surprising that the development of any crystallinity in the primer coating does not appear to hinder the formation of a functional bond between the primer coat and the nylon film or the primer coat and the top coat.

In the event that the primer-coated film is desired to be stored on a core prior to being top coated, it is desirable to incorporate an anti-blocking agent, e.g., silica, into the primer coat or to lay a slip sheet, as is known in the art, on top of the primer coat prior to winding the primer-coated film onto a core.

The amount of vinylidene chloride copolymer applied as a primer coating is typically in the range of about 1.6 to 4.9 grams of vinylidene chloride copolymer per square meter. The amount of vinylidene chloride copolymer applied as a top coat is determined to a large extent by the oxygen barrier properties desired. Typically, a permeability to oxygen in the range of less than about 15.63 ml/m²/atm/24 hrs. is desired, for which purpose between about 1.6 and 4.9 grams per square meter of vinylidene chloride copolymer top coat may be applied. Generally, the total amount of vinylidene chloride copolymer applied, i.e., primer coat and top coat, is between about 3.2 and 6.5 grams vinylidene chloride copolymer per square meter, and preferably about 6.5 grams vinylidene chloride copolymer per square meter.

As indicated hereinbefore, it may be desirable to modify the vinylidene chloride copolymer dispersions in order to minimize foaming, particularly as coating speeds rise above about 35 m/min. Known techniques include the addition of 5–10%, by weight, of isopropyl alcohol to the dispersion. It may also be desirable, particularly with some vinylidene chloride copolymers used as top coats, which crystallize relatively slowly, to include additives which enhance the rate of crystallization of the copolymer. Known additives include talc and some waxes, e.g., carauba wax. When carnauba wax is used, for example, about two parts of carnauba wax for every 100 parts of dry vinylidene chloride copolymer may be used. The carnauba wax is usually supplied in an emulsion and care must be taken to ensure that the surfactants used in the wax emulsion and the vinylidene chloride copolymer dispersion are compatible, e.g., both are anionic or both are cationic.

In order to minimize the chance that curling of the nylon film may occur during steps (a) and (b) of the process of the present invention, it is preferred that the nylon film be coated at a linear speed of at least about 100 m/min. Furthermore, the addition of isopropyl alcohol aids in drying and minimizes the chance of curl developing. Additionally, the uncoated side of the film may be subjected to moisture-laden air.

Nylon films useful in the present invention include nylon 6, nylon 66, nylon 6/10 and nylon 12 homopolymers and film-forming copolymers, for example, of ε-caprolactam and hexamethyleneadipamide. Nylon 66 is preferred over nylon 6 because of its lower sensitivity to the effects of moisture. The nylon film may be unoriented or oriented, either monoaxially or biaxially. The vinylidene chloride copolymer coated nylon film made according to the present invention may be laminated to polyethylene film, using conventional solvent laminating processes. In such processes an adhesive may be applied to the vinylidene chloride copolymer coating prior to laminating the polyethylene film thereto. Alternatively, the polyethylene may be extrusion-coated onto the top coating of vinylidene chloride copolymer. The polyethylene forms a heat sealable layer, for the manufacture of packages or pouches. Such nylon-vinylidene chloride copolymerpolyethylene film laminates are useful for vacuum packaging of processed foods, e.g., luncheon meats, weiners, bacon and cheese.

Crystalline vinylidene chloride copolymers favored for coatings, for use in so-called solvent lamination processes may be tested for their suitability by a test referred to herein as the Solvent Haze Test. Solvents used in the Solvent Haze Test are those solvents which may be used in solvent lamination processes, e.g., are those solvents present in the adhesive formulation. All of these solvents are organic and are capable of dissolving vinylidene chloride copolymers having a crystallinity index of less than 1.05. Examples of such solvents are acetone, ethyl acetate, toluene and methyl ethyl ketone. Acetone is often used in the Solvent Haze Test as it is a more effective solvent than many others and consequently is often used for a "quick and dirty" test. In the Solvent Haze Test, the vinylidene chloride copolymer, when dry and after allowing crystallinity to develop, is sprayed with the organic solvent to be used in the solvent lamination process. If the vinylidene chloride copolymer is suitable, i.e., has developed sufficient crystallinity, the copolymer will be unaffected by the solvent. If, however, the vinylidene chloride copolymer is insufficiently crystalline, the solvent will either turn the copolymer turbid in appearance or will dissolve portions or all of the copolymer. It appears that each vinylidene chloride copolymer has a characteristic minimum level of crystallinity, as indicated by its crystallinity index, above which it is resistant to attack by a particular solvent. For example Daran TM 220 vinylidene chloride copolymer must have a crystallinity index of about 1.30 or higher to resist attack by acetone, whereas the minimum crystallinity index for Serfene TM 411 and 4000 vinylidene chloride copolymer appears to be about 1.19 and about 1.23, respectively, in order to resist attack by acetone.

Crystallinity index, as defined in the present specification, is determined by infrared spectroscopy by obtaining an attenuated total reflectance infrared spectrum of the coated film. Crystallinity index may be measured using a Perkin Elmer TM 467 Infrared spectrophotometer and a Wilks TM ATR-9 attenuated total reflectance unit with a germanium crystal cut at 45°. In the method, two rectangles of film are placed, vinylidene chloride copolymer coated side towards the crystal, on either side of the germanium crystal. The reference beam attenuator is set at 85% at 1150 cm$^{-1}$ and the sample is scanned between 950 cm$^{-1}$ and 1150 cm$^{-1}$. The absorbances A of the background, at 1115 cm$^{-1}$, and at the peaks, at 1070 cm$^{-1}$ and 1042 cm$^{-1}$, are measured. Crystallinity index is calculated by dividing the difference between $A_{1042}$ and $A_{1115}$ by the difference between $A_{1070}$ and $A_{1115}$.

EXAMPLE I 24.5 μm thick cast, i.e., unoriented nylon 66 film was first coated by a direct gravure method at a linear speed of 1.83 m/min. with 1.63 g/m$^2$ of an amorphous vinylidene chloride copolymer available under the trade mark Serfene TM 2060 and dried in the conventional manner. The crystallinity index of Serfene TM 2060, when dry, and measured after 30 days' storage at 20° C., was found to be 1.0 and when dry and measured after 48 hours' storage at 40° C., was found to be 1.06. At the discharge of the dryer, a polyethylene sheet with a surface tension less than 38 mN/m was introduced to act as a slip sheet. The primer-coated film was then placed on the unwind stand of the coater and the primer-coated nylon film was direct gravure-coated at a linear speed of 1.83 m/min. with 4.9 g/m$^2$ of Serfene TM 411 crystalline vinylidene chloride copolymer dispersion and, after drying, was wound up on a core with a first winder. The dispersion contained 55%, by weight, of solids. A second winder was used to take up the polyethylene slip sheet. The resulting vinylidene chloride copolymer coated film was stored at 20° C. for five days. The crystallinity index of the crystalline vinylidene chloride copolymer was then 1.20. The Solvent Haze Test was performed with acetone. The crystalline copolymer was unaffected. The coated film was then laminated to a 50.8 μm polyethylene film using a single component polyurethane adhesive dissolved in ethylacetate as solvent. After five days at 20° C. the laminate was tested for bond strength by pulling the nylon and polyethylene films apart with a Suter TM tester. The bond strength was found to be at least 790 g/cm, with the polyethylene orienting rather than pulling away from the vinylidene chloride copolymer coating.

EXAMPLE II

As in Example I, the cast nylon 66 film was primed using Serfene TM 2060 amorphous vinylidene chloride copolymer to which had been added 0.5 parts, by weight, of Syloid TM silicon dioxide particles per 100 parts, by weight, of dry vinylidene chloride copolymer. The silicon dioxide was added as an anti-blocking agent. The mixture of silicon dioxide and vinylidene chloride copolymer dispersion was applied using the direct gravure method, dried and wound up on a core without the aid of a slip sheet. The roll of primer-coated nylon film was unwound and reverse gravure top coated with Serfene TM 411 crystalline vinylidene chloride copolymer at 4.9 g/cm and aged for five days at 20° C. The coated film was laminated to polyethylene as in Example I. The bond strength was measured and found to be at least 790 g/cm.

EXAMPLE III

As in Example I, the following nylon films were primed with Serfene TM 2060 amorphous vinylidene chloride copolymer and top coated with Serfene TM 411 crystalline vinylidene chloride copolymer films. The table below illustrates the bond strengths:

| Base Film | Laminate Bond Strength |
|---|---|
| Monoaxially Oriented Nylon 66 | At least 790 g/cm |
| Biaxially Oriented Nylon 6 | 345 g/cm |
| Unoriented Nylon 6 | At least 790 g/cm |
| Oriented Copolymer of hexamethylene-adipamide and ε-caprolactam (90–10%) | At least 790 g/cm |

EXAMPLE IV 25.4 μm thick cast nylon copolymer (90–10% hexamethyleneadipamide-ε-caprolactam copolymer) film was first coated by a direct gravure method at a linear speed of 1.83 m/min. with 1.63 g/m² of Serfene TM 2060 vinylidene chloride copolymer and dried in the conventional manner. After drying, the primer-coated film was coated by a direct gravure method with 4.9 g/m² of Serfene TM 4000 vinylidene chloride copolymer. After drying, the coated nylon film was wound up on a core. The crystallinity index of Serfene TM 4000 vinylidene chloride, when dry, and measured after 10, 19 and 32 days at 20° C., was 1.14, 1.23 and 1.22, respectively. The Solvent Haze Test was performed with acetone on the Serfene TM 4000 top coat after each of 10, 19 and 32 days. The top coat, after 10 and 19 days' storage, was attacked by acetone, i.e., became dissolved and milky, respectively. The Solvent Haze Test was also conducted on the coated film, after 19 days' storage at 20° C., with ethyl acetate, toluene and methyl ethyl ketone. The film so-tested was slightly hazy after treatment with ethyl acetate or toluene, and the vinylidene chloride copolymer was dissolved by the methyl ethyl ketone. As a result, this coated nylon film, after 19 days' storage at 20° C., had an insufficiently crystallized top coat for satisfactory solvent lamination. After 32 days' storage at 20° C., however, the top coat was unaffected by acetone and the coated nylon film proved satisfactory for solvent lamination. It will be noted that the crystallinity indices of the dried Serfene TM 4000 after 19 and 32 days' storage are similar, and yet the results of the Solvent Haze Test are different. This may be due to the fact that the accuracy of the crystallinity index measurement is ±0.02. There may also be factors other than crystallinity index that affect the outcome of the Solvent Haze Test, however.

EXAMPLE V

This example demonstrates that crystalline vinylidene chloride copolymer dispersions applied directly to nylon film do not adhere well to the nylon film 25.4 μm thick. Cast nylon 66 film was coated by a direct gravure method at a linear speed of 1.83 m/min. using a dispersion of a crystalline vinylidene chloride copolymer dispersion available under the trade mark Serfene TM 411. The dispersion, which contained 55% solids, was applied at the rate of 4.9 g/m². The resulting coated film was dried and allowed to age for five days at 20° C. The crystallinity index of the vinylidene chloride copolymer film was measured and found to be 1.20. The vinylidene chloride copolymer film was laminated to 50.8 μm polyethylene film using a single component polyurethane adhesive. After five days at 20° C., the laminate was tested for bond strength by pulling the nylon and polyethylene films apart with a Suter TM tester. The bond strength was measured to be less than 7.9 g/cm with the crystalline vinylidene chloride copolymer coating lifting completely off the nylon 66 film surface and adhering to the polyurethane adhesive.

In a further test, 25.4 μm cast nylon 66 film was coated by a direct gravure method at a linear speed of 1.83 m/min. using a crystalline vinylidene chloride copolymer dispersion available under the trade mark Serfene TM 4000 admixed with 5%, by weight, of the dispersion of isopropyl alcohol and two parts, by weight, of canauba wax per 100 parts, by dry-basis weight, of the copolymer. The copolymer was applied at the rate of 4.9 g/m² of dispersion (55% solids). The resulting film was dried, and stored at 20° C. for about 30 days. The resulting coated film was laminated to a 50.8 μm polyethylene film using a single component polyurethane adhesive. The bond strength was determined to be about 790 g/cm. The coated film was then stored for 30 days at 20° C., after which time the bond strength had dropped to about 50 g/cm.

EXAMPLE VI

This example serves to show that the amorphous vinylidene chloride copolymer primer-coated nylon film may be stored for a sufficiently-long time or at a sufficiently-high temperature that crystallinity develops, and yet that the development of crystallinity still allows a functional bond between the primer coat and the nylon film, and primer coat and the top coat.

In one test, cast nylon 66 film was primer-coated with Daran TM 820 amorphous vinylidene chloride copolymer dispersion, which after drying, was stored at 40° C. for five days. The crystallinity index of the Daran TM 820 copolymer was then measured to be 1.30. Daran TM 820 vinylidene chloride copolymer has a crystallinity index, when dry and after storing at 40° C. for 48 hours, of 1.15. In another test, cast nylon 66 film was coated with Serfene TM 2060 amorphous vinylidene chloride copolymer dispersion and, after drying, was stored at 40° C. for eight days. The crystallinity index of the Serfene TM 2060 copolymer was measured to be 1.35. The primer-coated nylon films were then laminated to 50.8 μm polyethylene film, as described in Example II and bond strengths measured on a Suter TM tester. The laminate containing the Daran TM 820 copolymer primer coat had a bond strength of at least 790 g/cm. The laminate containing the Serfene TM 2060 copolymer primer coat had a bond strength of 354 g/cm, and the bond failure occurred between the top coat and the polyurethane adhesive.

Although not wishing to be bound by any theory, it is thought that, during the application and drying of the top coat to the primer-coated nylon film, some if not all, crystallinity which has developed in the amorphous vinylidene chloride copolymer, is destroyed and the amorphous vinylidene chloride copolymer primer coat returns to a substantially-amorphous state. It is believed that the bond strength of the laminate may become weaker if the laminate is stored for a long time, e.g., 6–12 months, particularly at elevated temperatures; but this is not expected to be of any consequence from a commercial standpoint for laminates which are stored for up to about 60 days. Again, while not wishing to be bound by any theory, it is suspected that the bond strength, if weakened, may be restored during vacuum thermoforming operations to which the laminate may be subjected, for example, when packaging food.

We claim:

1. A nylon film coated with a vinylidene chloride copolymer, said film having been prepared by a process comprising:
    (a) coating the nylon film with an aqueous dispersion of a vinylidene chloride copolymer while keeping the nylon film under sufficient machine and transverse direction tensions to prevent curling, to form a primer-coated film, said vinyldiene chloride copolymer having a crystallinity index of less than 1.15, when dry, after 30 days' storage at 20° C., and a crystallinity index, when dry, between about 1.05 and 1.20 when stored for 48 hours at 40° C.;
    (b) drying the primer-coated film to remove substantially all of the water from the dispersion, while maintaining the primer-coated film under said machine and transverse direction tensions and at a drying rate sufficiently high to prevent curling of the primer-coated film;
    (c) coating the primer-coated film with an aqueous dispersion of a vinylidene chloride copolymer which, when dry, is capable of developing crystallinity to a level sufficient that the crystalline vinylidene chloride copolymer so-formed resists attack by an organic solvent, as measured by the Solvent Haze Test, said organic solvent being capable of dissolving vinylidene chloride copolymers having a crystallinity index of less than 1.05, to form a vinylidene chloride copolymer coated film; and
    (d) drying the vinylidene chloride copolymer coated film.

2. A film according to claim 1 in which the vinylidene chloride copolymer applied in step (a) has a crystallinity index, when dry, of between 1.0 and 1.05 when stored for 30 days at 20° C., and a crystallinity index, when dry, between about 1.05 and 1.20 when stored for 48 hours at 40° C.

3. A film according to claims 1 or 2 in which the vinylidene chloride copolymer applied in step (c) has sufficient crystallinity to be unaffected by acetone, ethyl acetate, methyl ethyl ketone or toluene in the Solvent Haze Test.

4. A process for coating nylon film with a vinylidene chloride copolymer, comprising:
    (a) coating the nylon film with an aqueous dispersion of vinylidene chloride copolymer while keeping the nylon film under sufficient machine and transverse direction tensions to prevent curling of the nylon film, to form a primer-coated film, said vinylidene chloride copolymer having a crystallinity index of less than 1.15, when dry, after 30 days' storage at 20° C., and a crystallinity index, when dry, of between about 1.05 and 1.20 when stored for 48 hours at 40° C.;
    (b) drying the primer-coated film to remove substantially all of the water from the dispersion, while maintaining the primer-coated film under said machine and transverse direction tensions and at a drying rate sufficiently high to prevent curling of the primer-coated film;
    (c) coating the primer-coated film with an aqueous dispersion of a vinylidene chloride copolymer which, when dry, is capable of developing crystallinity to a level sufficient that the crystalline vinylidene chloride copolymer so-formed resists attack by an organic solvent, as measured by the Solvent Haze Test, said organic solvent being capable of dissolving vinylidene chloride copolymers having a crystallinity index of less than 1.05, to form a vinylidene chloride copolymer coated film; and
    (d) drying the vinylidene chloride copolymer coated film.

5. A process according to claim 1 in which the vinylidene chloride copolymer applied in step (a) has an amount of a low boiling alcohol sufficient to prevent foaming of the dispersion upon coating of the film, and to aid in the quick drying of step (b).

6. A process according to claim 1 in which the vinylidene chloride copolymer applied in step (a) has a crystallinity index, when dry, of between 1.0 and 1.05 when stored for 30 days at 20° C., and a crystallinity index, when dry, between about 1.05 and 1.20 when stored for 48 hours at 40° C.

7. A process according to claim 4 in which the vinylidene chloride copolymer applied during step (c) is capable of crystallizing to a crystallinity index, when dry, of 1.20 or higher, after storage of up to 24 days at 20° C.

8. A process according to claim 4 in which the vinylidene chloride copolymer dispersion applied during step (c) is applied using a low shear method of application.

9. A process according to claim 6 in which the vinylidene chloride copolymer dispersion applied during step (c) is applied using a low shear method of application.

10. A process according to claims 7, 8 or 9 in which the low shear method is selected from smooth roll, Meyer TM rod, offset gravure and reverse gravure methods.

* * * * *